United States Patent
Jia

(10) Patent No.: US 8,614,695 B2
(45) Date of Patent: Dec. 24, 2013

(54) ULTRASONIC TRACKING

(75) Inventor: Ying Jia, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1177 days.

(21) Appl. No.: 10/558,970

(22) PCT Filed: Jun. 7, 2005

(86) PCT No.: PCT/CN2005/000801
§ 371 (c)(1),
(2), (4) Date: Nov. 14, 2007

(87) PCT Pub. No.: WO2006/131022
PCT Pub. Date: Dec. 14, 2006

(65) Prior Publication Data
US 2008/0128178 A1 Jun. 5, 2008

(51) Int. Cl.
G06F 3/043 (2006.01)

(52) U.S. Cl.
USPC .......................................... 345/177

(58) Field of Classification Search
USPC ............ 345/156–158, 177, 179; 702/39, 159, 702/171
See application file for complete search history.

(56) References Cited

U.S. PATENT DOCUMENTS

| | | | | |
|---|---|---|---|---|
| 4,452,082 A * | 6/1984 | Miwa | | 73/599 |
| 4,506,354 A * | 3/1985 | Hansen | | 367/101 |
| 5,260,969 A * | 11/1993 | Kato et al. | | 375/150 |
| 5,487,306 A * | 1/1996 | Fortes | | 73/597 |
| 5,637,839 A | 6/1997 | Yamaguchi et al. | | |
| 5,844,824 A * | 12/1998 | Newman et al. | | 345/156 |
| 6,184,873 B1 | 2/2001 | Ward et al. | | |
| 6,335,723 B1 * | 1/2002 | Wood et al. | | 345/173 |
| 6,703,570 B1 | 3/2004 | Russell et al. | | |
| 2002/0097885 A1* | 7/2002 | Birchfield et al. | | 381/92 |
| 2004/0037436 A1* | 2/2004 | Rui | | 381/92 |
| 2005/0084112 A1* | 4/2005 | Kim et al. | | 380/268 |
| 2006/0097983 A1* | 5/2006 | Haggman et al. | | 345/156 |

OTHER PUBLICATIONS

"International Search Report for Corresponding International Application", PCT/CN2005/000801, 3 pages.

* cited by examiner

Primary Examiner — Kenneth Bukowski
(74) Attorney, Agent, or Firm — Caven & Aghevli LLC

(57) ABSTRACT

In one embodiment, a tracking module (110) to select a plurality of pairs of digital ultrasonic signals to form two or more pairs of digital ultrasonic signals and estimate time difference of arrival (TDOA) for each of the two or more pairs of digital ultrasonic signals. The tracking module (110) may further determine an intersection of each pair of the TDOA estimated digital ultrasonic signals to form one or more intersections and a location of an ultrasonic signal generator (102) corresponding to at least one of the one or more intersections.

27 Claims, 13 Drawing Sheets

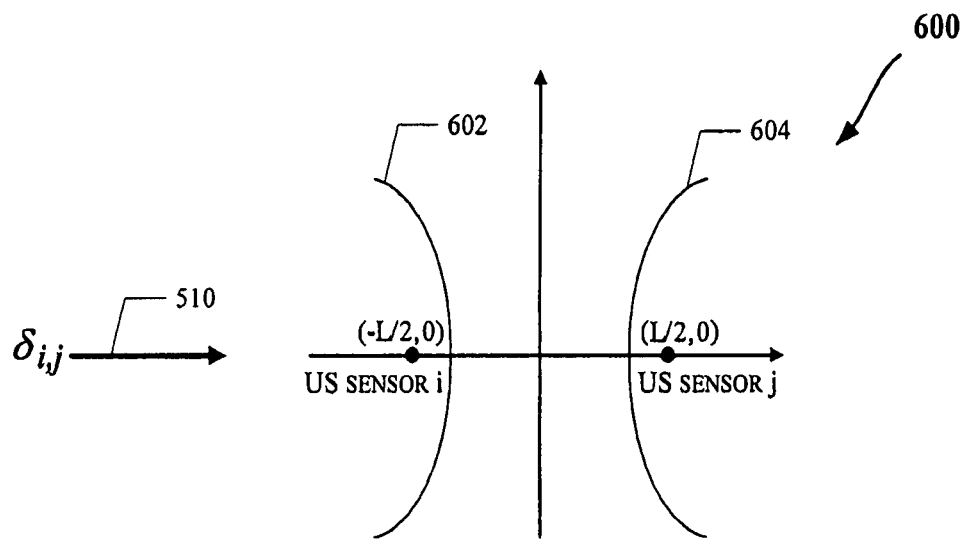
FIG. 6A
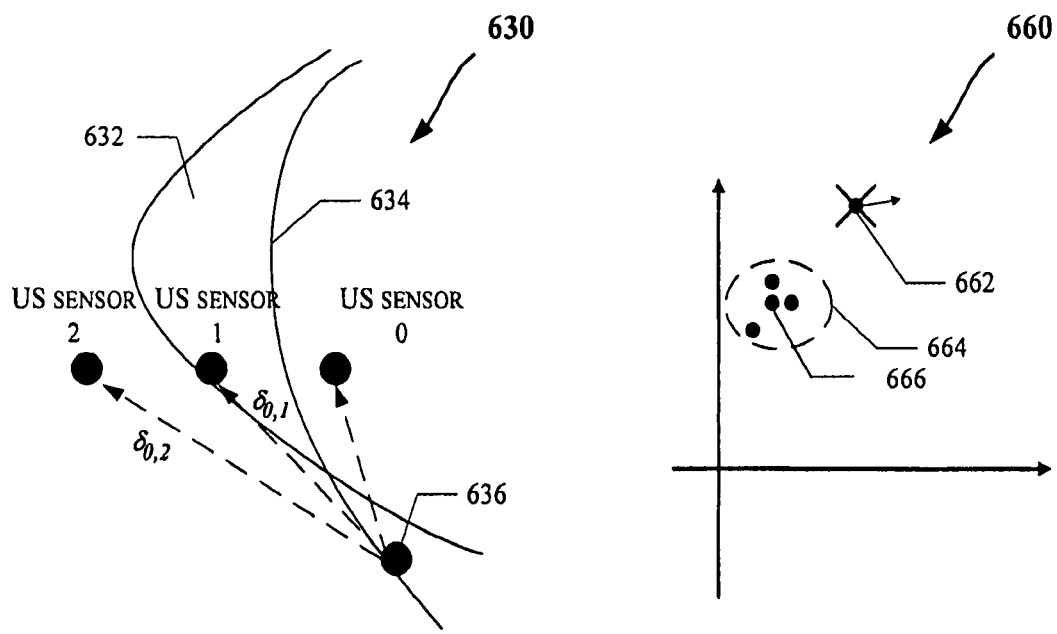
FIG. 6B
FIG. 6C

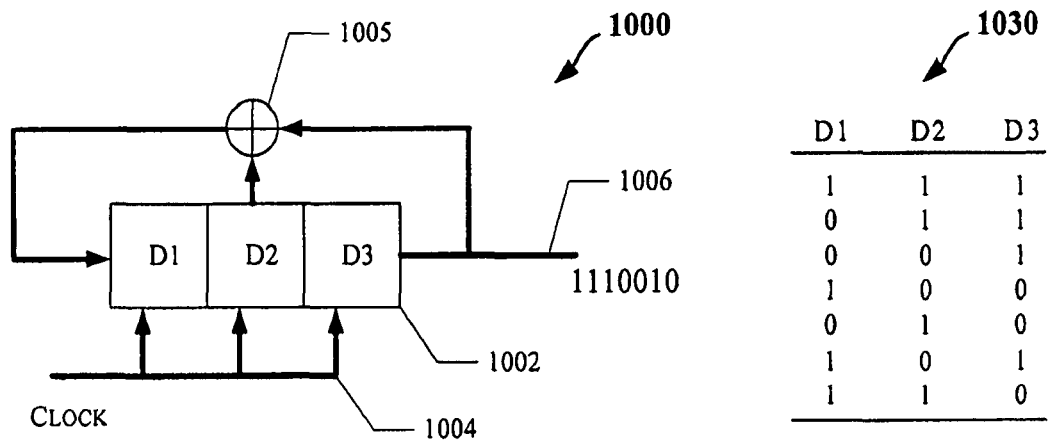
FIG. 10A
FIG. 10B
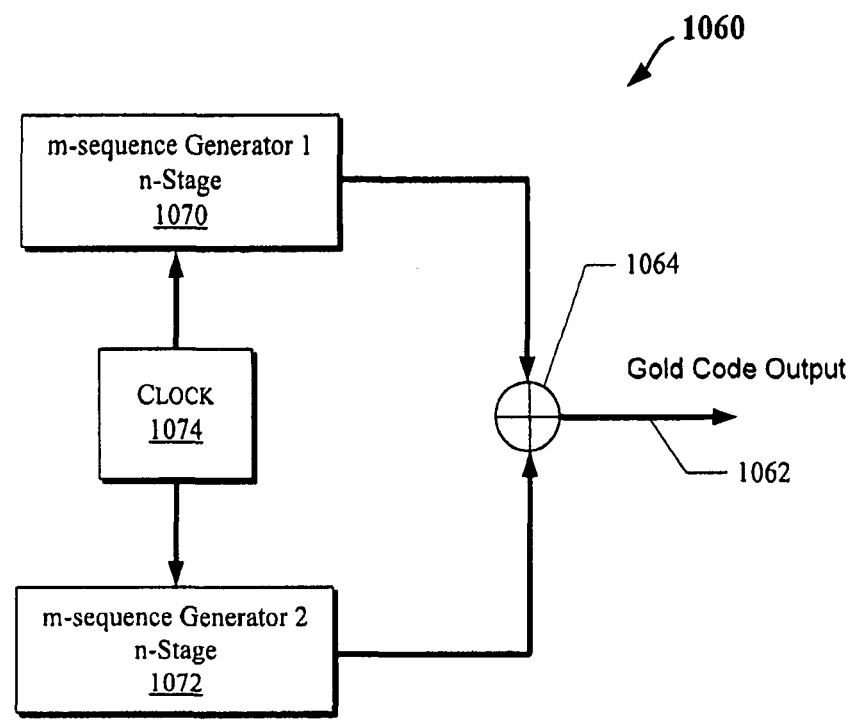
FIG. 10C

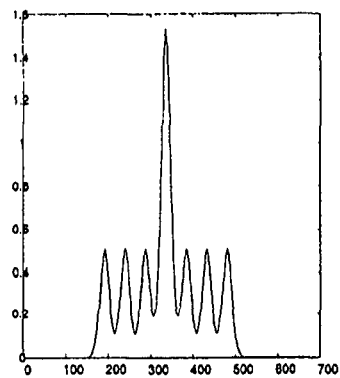
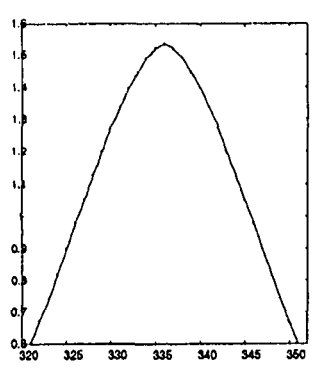
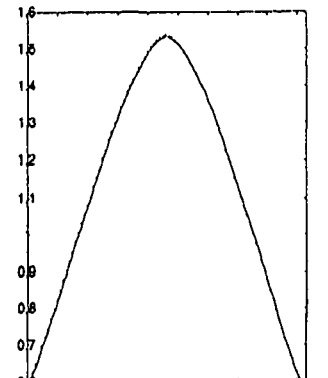
FIG. 12F    FIG. 12G    FIG. 12H
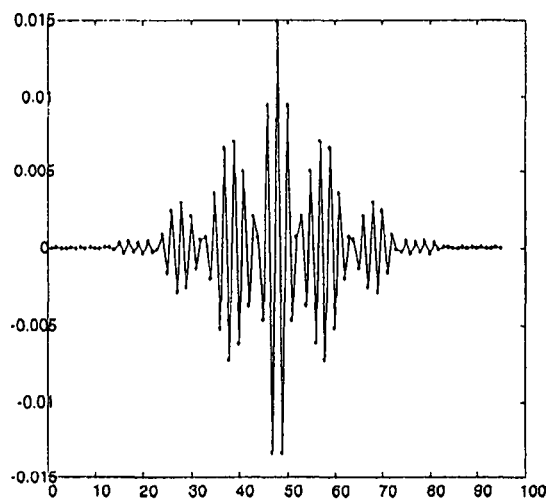
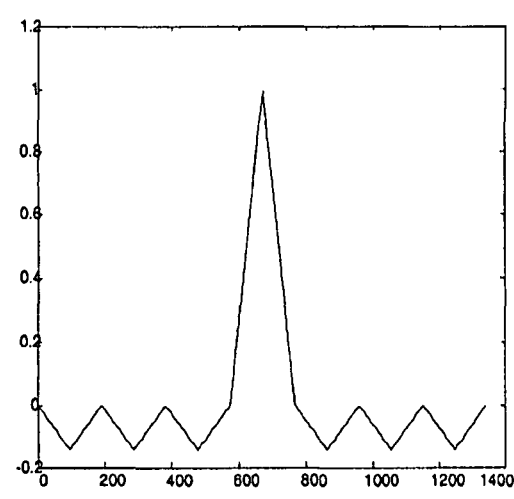
FIG. 13A    FIG. 13B

US 8,614,695 B2

ULTRASONIC TRACKING

BACKGROUND

Ultrasonic (US) pen systems generally include a pen and a panel. A user may use the pen to write on the panel. The pen may generate ultrasonic signals which the panel digitizes and provides to a computer. Thus, the signals transmitted by the pen may be utilized in determining the location of the pen.

Some ultrasonic pen systems may utilize an algorithm based on time of arrival (TOA) of the ultrasonic signals to determine pen locations. For example, one TOA-based algorithm may utilize the characteristics of the ultrasonic signals to determine pen locations. However, since ultrasonic signals for pens from different manufacturers may have different characteristics, these pens may not be compatible with panels provided by other manufacturers. Also, another TOA-based algorithm may utilize infrared (IR) synchronization signals to determine pen locations. Accordingly, such pen systems utilize IR transmitters and receivers which increase the expense of such systems. Also, the IR signals may be prone to environmental interference such as sunlight, temperature, artificial light, and the like. Some systems may also be prone to acoustic or mechanical noise such as sonic or ultrasonic noise and ultrasonic reflection.

Other techniques that may be utilized in locating mobile units may lack sufficient resolution for pen system applications. For example, a global positioning system (GPS) may provide sufficient resolution to locate a cellular phone on a street but lacks the resolution to recognize pen locations on a panel. Also, angle of arrival (AOA) algorithms suffer from blind regions and may utilize expensive antenna arrays that may be impractical for ultrasonic pen systems.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in figures indicates similar or identical items.

FIGS. 6A-6C illustrate graphs which may be utilized to provide one or more of the results discussed with reference to the stages of FIG. 4, according to some embodiments.

FIG. 10A illustrates a block diagram of an embodiment of an m-sequence generator.

FIG. 10B illustrates an embodiment of a table of values shifted through the register 1002 of FIG. 10A.

FIG. 10C illustrates a block diagram of an embodiment of a gold sequence generator.

FIGS. 12A-H and 13A-B illustrate sample waveforms, according to various embodiments.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Figure 1:
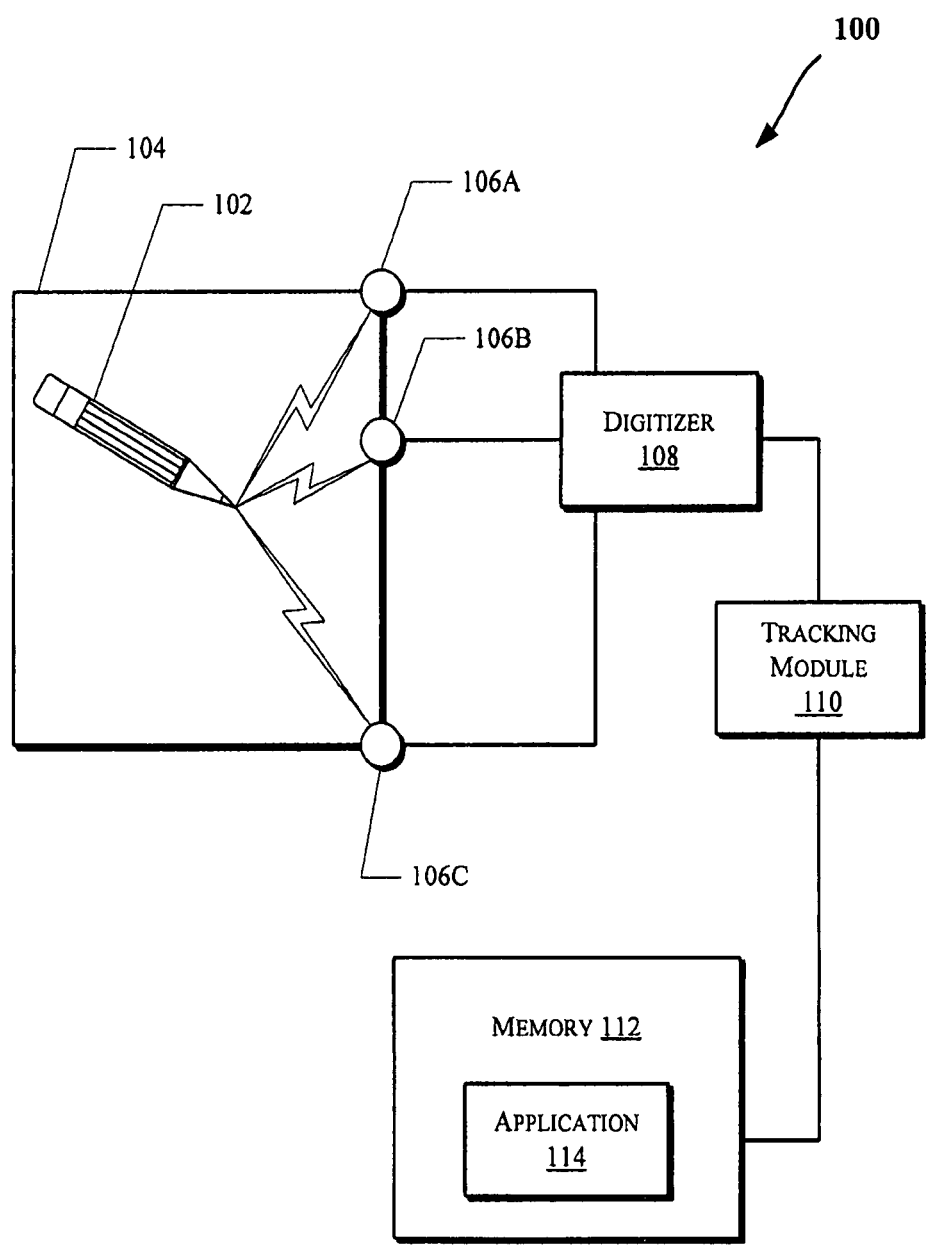
FIGS. 1, 2, 7, and 9 illustrate embodiments of ultrasonic tracking systems.

FIG. 1 illustrates an embodiment of an ultrasonic tracking system 100. The system 100 may utilize ultrasonic signals to track the location of an ultrasonic signal generator 102. The ultrasonic signal generator 102 may be any suitable ultrasonic device that includes one or more ultrasonic transducers to generate ultrasonic signals. For example, the ultrasonic signal generator 102 may be a pen (such as illustrated in FIG. 1) to write on a panel 104. A user may utilize the ultrasonic signal generator 102 to write, draw, paint, select items from a list, etc. on the panel 104. The panel 104 may be any suitable panel such as a panel integrated in a computing device (e.g., computing device 1400 discussed with reference to FIG. 14). Moreover, the panel 104 may be integrated in a tablet computing device, e.g., as the tablet (or screen) that a user may interact with. The panel 104 may also be a separate device that is coupled to a computing device via a bus (as will be further discussed with reference to bus 1422 of FIG. 14). As a user utilizes the ultrasonic signal generator 102 on the panel 104, the ultrasonic signal generator 102 may generate ultrasonic signals (e.g., when the tip of the pen (102) is pressed against, touches, or is in proximity to the panel 104). Hence, the ultrasonic signal generator 102 may include one or more suitable ultrasonic transmitters (or transducers), as will be further discussed with reference to FIG. 11.

The system 100 may further include one or more ultrasonic sensors (or receivers) 106 (e.g., 106A, 106B, 106C, etc.). The sensors 106 may be any suitable ultrasonic sensor such as a microphone or the like. The sensors 106 may be coupled to a digitizer 108 to convert the analog ultrasonic signals received by the sensors 106 (e.g., from the ultrasonic signal generator 102) into digital format. For example, the digitizer 108 may include an analog to digital (A/D) converter, a signal sampling logic, or the like. The digitizer 108 may be implemented in any suitable location such as within the panel 104, within a computing device (such as computing device 1400 of FIG. 14), or the like. The digital signals from the digitizer 108 may be provided to a tracking module 110 that determines the location (or coordinates) of the ultrasonic signal generator 102 based on the digital signals. The tracking module 110 may be provided as hardware, software, firmware, or combinations thereof in various embodiments. As will be further discussed here (e.g., with reference to FIGS. 2 and 4), the time difference of arrival (TDOA) of the digital ultrasonic signals may be utilized to determine (or estimate) the location of the ultrasonic signal generator 102. Also, the tracking module 110 may be coupled to a memory 112 (such as memory 1412 of FIG. 14) that stores an application 114. Hence, the tracking module 110 may provide the location of the ultrasonic signal generator 102 to the application 114. In an embodiment, the location of the ultrasonic signal generator 102 may be relative coordinates with respect to the panel 104 and/or the sensors 106. The application 114 may use the coordinates of the ultrasonic signal generator 102 to determine user inputs.

Figure 2:
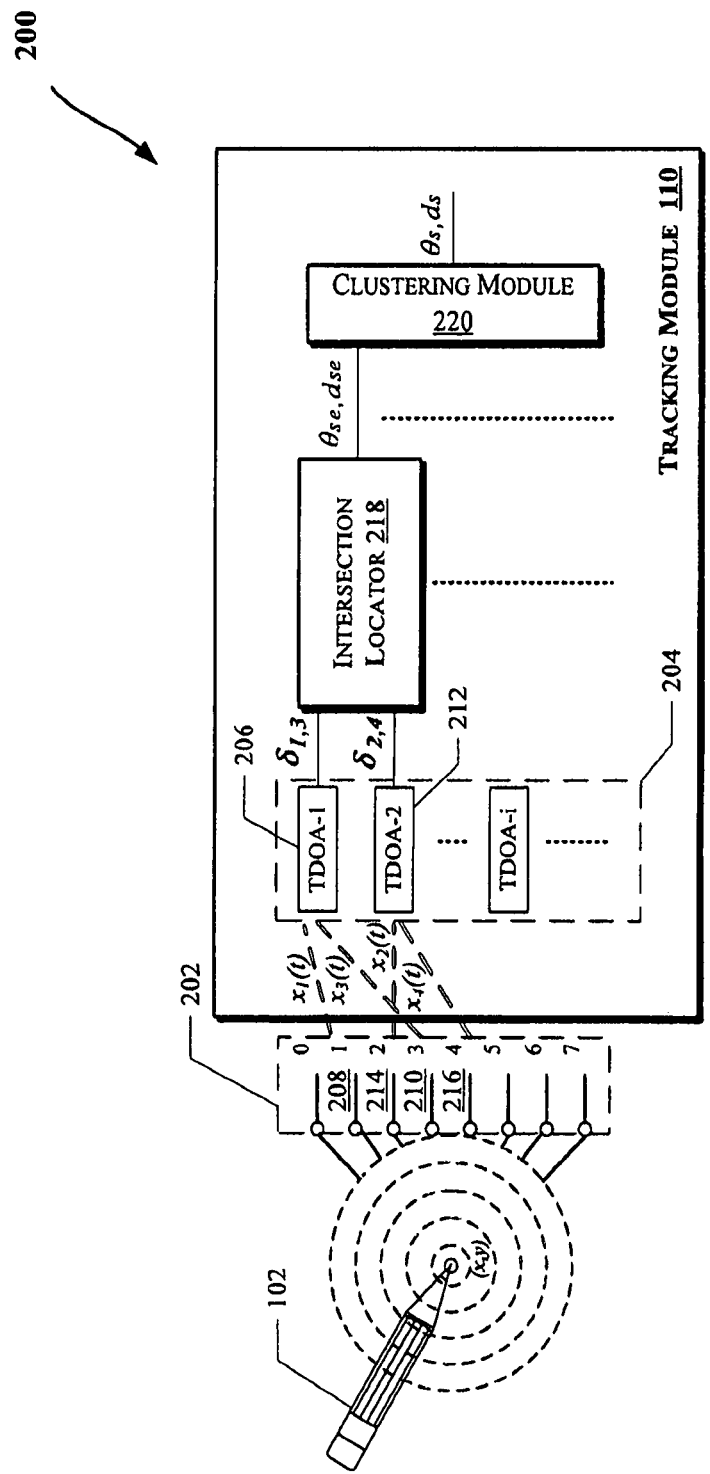

FIG. 2 illustrates a block diagram of an embodiment of an ultrasonic tracking system 200. The system 200 may include the ultrasonic signal generator 102 and an array of ultrasonic receivers 202 to receive the generated ultrasonic signals. As discussed with reference to FIG. 1, the ultrasonic signals from the ultrasonic signal generator 102 may be digitized (e.g., by the digitizer 108) prior to providing the signals to the tracking module 110. Furthermore, the array 202 may digitize the generated ultrasonic signals in an embodiment.

Figure 3:
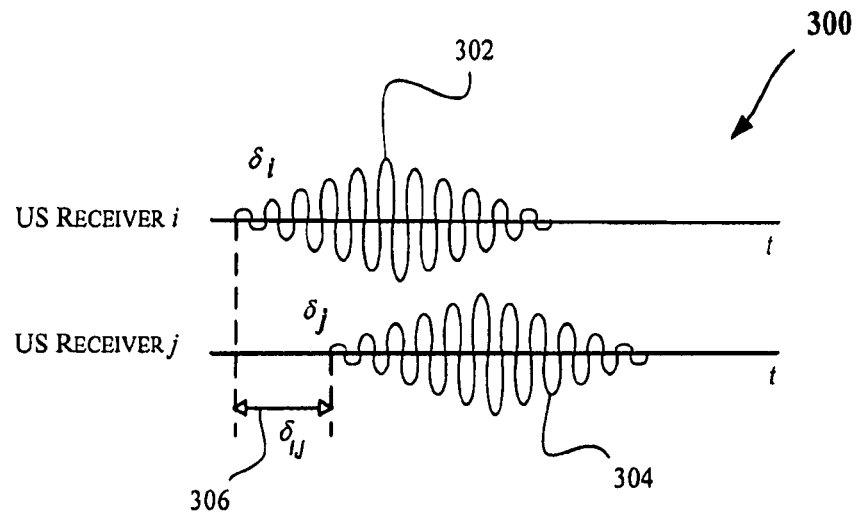
FIG. 3 illustrates a graph of sample ultrasonic signals.

FIG. 3 illustrates a graph 300 of sample ultrasonic signals (302 and 304) received by two of the sensors in the array 202 of FIG. 2, in accordance with an embodiment. As will be further discussed with respect to FIGS. 2 and 4, the time difference of arrival (TDOA) of the ultrasonic signals (306) may be utilized in determining (or estimating) the location (or coordinates) of the ultrasonic signal generator 102.

Figure 4:
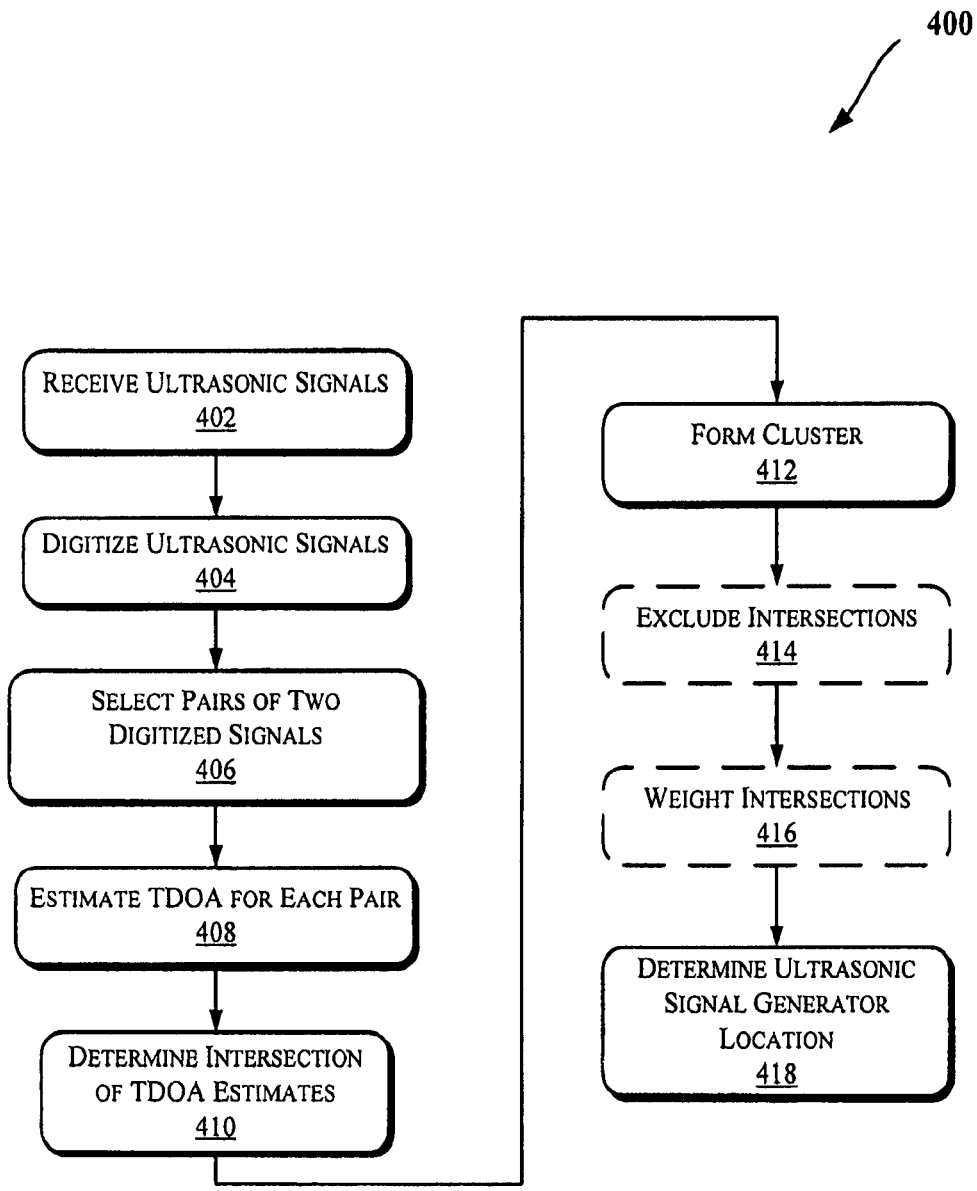
FIGS. 4 and 8 illustrate flow diagrams of embodiments of methods to determine the location of an ultrasonic signal generator.

FIG. 4 illustrates a flow diagram of an embodiment of a method 400 to determine the location of an ultrasonic signal generator. In an embodiment, the systems 100 and 200 of FIGS. 1 and 2 may perform one or more stages discussed with reference to FIG. 4. Also, some stages of the method 400 (such as 406-418) may be performed by instructions stored on a computer readable medium and executed on one or more processors (such as processors 1402 of FIG. 14).

Referring to FIGS. 1, 2, and 4, one or more ultrasonic sensors (e.g., sensors 106) or an array of ultrasonic receivers (202) may receive the ultrasonic signals generated by the ultrasonic signal generator 102 (402). The received signals (402) may be digitized (e.g., by the digitizer 108 and/or the array 202), e.g., to form digital ultrasonic signals. At a stage 406, a plurality of pairs of the digital ultrasonic signals (404) may be selected (e.g., from at least three of the sensors in the array 202 in an embodiment). Hence, the plurality of selected pairs (406) may be used to form two or more pairs of digital ultrasonic signals. For example, the tracking module 110 may include one or more TDOA modules 204 (such as 206 and 208). The TDOA modules 204 may perform the stage 406 in an embodiment. For instance, the TDOA module 206 may select the signals from a pair of receivers (208 and 210) and the TDOA module 212 may select the signals from another pair of receivers (214 and 216).

At a stage 408, the time difference of arrival (TDOA) of each of the pairs of the stage 406 are estimated (e.g., by the TDOA modules 204). The intersection of each pair of the TDOA estimated digital ultrasonic signals are determined (410), e.g., by one or more intersection locator(s) 218. A clustering module 220 may utilize a plurality of the intersections (410) to form a cluster (412). In one embodiment, the clustering module 220 may optionally exclude (416) one or more of the intersections from the cluster (414), e.g., because the excluded intersection(s) are more than a threshold distance from other members of the cluster, as will be further illustrated with reference to FIG. 6C. In an optional stage 416, the clustering module 220 may weight the intersections in the cluster according to the distance between the ultrasonic signal generator 102 and the respective receiver (202). Hence, the closer receivers may render a more accurate result and may be weighted higher.

At a stage 418, the location (or coordinates) of the ultrasonic signal generator 102 is determined which corresponds to at least one of the intersections. The center of the cluster may be selected as the location of the ultrasonic signal generator 102 in one embodiment. In one embodiment, the method 400 may be utilized for any ultrasonic pen, e.g., since any ultrasonic signal generated by an ultrasonic signal generator (102) may be utilized to determine the location of the ultrasonic signal generator (102).

Figure 5:
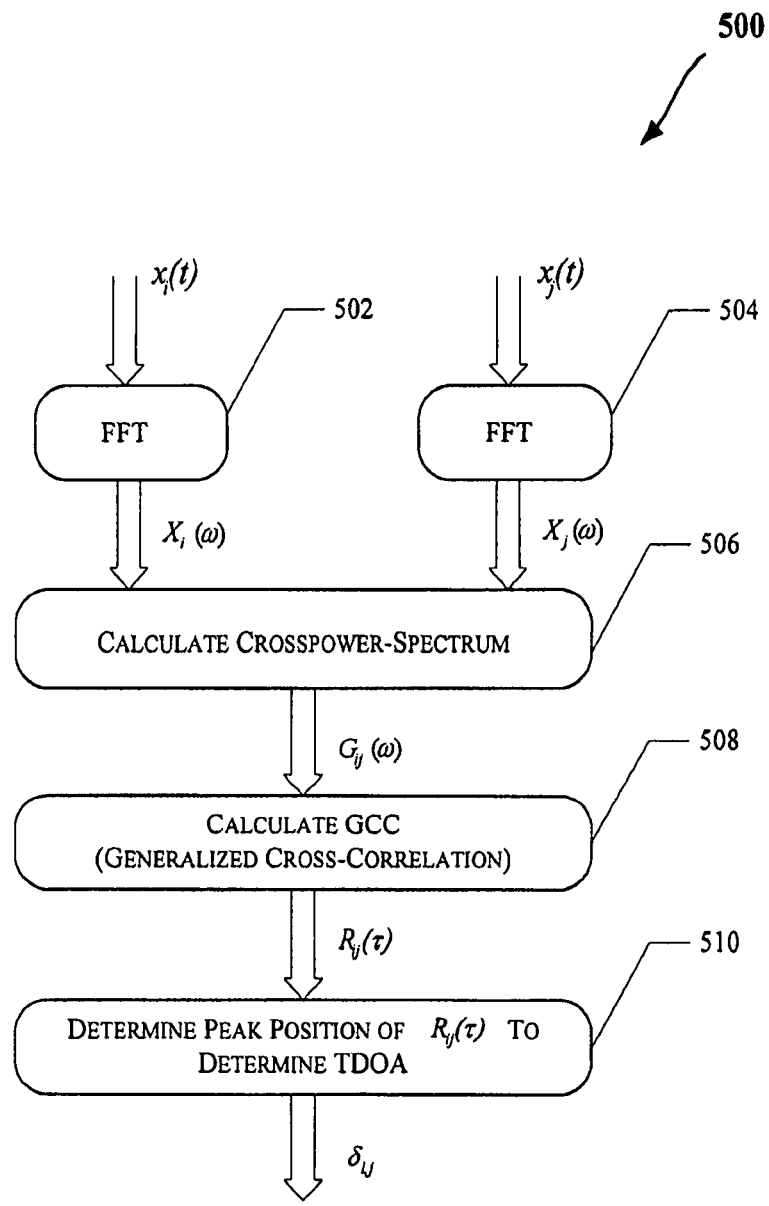
FIG. 5 illustrates a flow diagram of an embodiment of a method to estimate the time difference of arrival (TDOA) of a pair signals.

FIG. 5 illustrates a flow diagram of an embodiment of a method 500 to estimate the time difference of arrival (TDOA) of a pair signals. In one embodiment, the method 500 may be utilized to perform the stage 408 of FIG. 4. Furthermore, each of the TDOA modules 204 of FIG. 2 (e.g., modules 206 and/or 212) may be utilized to perform the stages of the method 500.

The stages 502 and 504 calculate the fast Fourier transform (FFT) of a pair of digital ultrasonic signals according to the following:

$$X_i(\omega) = \int x_i(t) e^{-j\omega t} dt$$

where $X_i(\omega)$ is the FFT, $x_i(t)$ is the digital ultrasonic signal, $j\omega$ is the frequency element at w, and t is time.

At the stage 506, the crosspower-spectrum of the pair from the stages 502 and 504 is calculated as follows:

$$G_{ij}(\omega) = X_i(\omega) \cdot X_j^H(\omega)$$

where $X_j^H(\omega)$ is the conjugate version of $X_j(\omega)$.

At a stage 508, the generalized cross-correlation (GCC) of the crosspower-spectrum of the stage 506 is calculated as follows:

$$R_{ij}(\tau) = \int W(\omega) G_{ij}(\omega) e^{j\omega t} d\omega$$

In an embodiment, the weighting function W ($\omega$) may be any suitable weighting function, such as ML (maximum likelihood), PHAT (phase transform), modified PHAT criterion, or the like. In some embodiments, ML may be sensitive to reverberation and/or non-stationary noise. Since PHAT is less sensitive to reverberation, the modified PHAT criterion may be selected as the weighting function where potential for reverberation and/or non-stationary noise may be present.

At a stage 510, the peak position of the GCC of the stage 508 is determined to determine the TDOA as follows:

$$\delta_{ij} = \underset{\tau}{\operatorname{argmax}} R_{ij}(\tau)$$

FIGS. 6A-6C illustrate graphs 600-660 which may be utilized to provide one or more of the results discussed with reference to the stages of FIG. 4, according to some embodiments. Graph 600 of FIG. 6A illustrates hyperbolas 602 and 604 that may be drawn for the digital ultrasonic signals that are output from the TDOA modules 204 of FIG. 2, from the stage 408 of FIG. 4, and/or the stage 510 of FIG. 5. Graph 630 of FIG. 6B illustrates hyperbolas 632 and 634 (e.g., resulting from TDOA estimates for the pair from ultrasonic receivers 0,2 and the receivers 0,1, respectively). As illustrated in FIG. 6B, the hyperbolas 632 and 634 intersect at an intersection 636. Graph 660 of FIG. 6C illustrates multiple intersections with an excluded intersection (662), such as discussed with the stage 414 of FIG. 4. The intersection 662 is excluded from the cluster 664. The center of the cluster 664 is an intersection 666 which may be selected as the location of the ultrasonic signal generator (102) such as discussed with reference to the stage 418 of FIG. 4.

Figure 7:
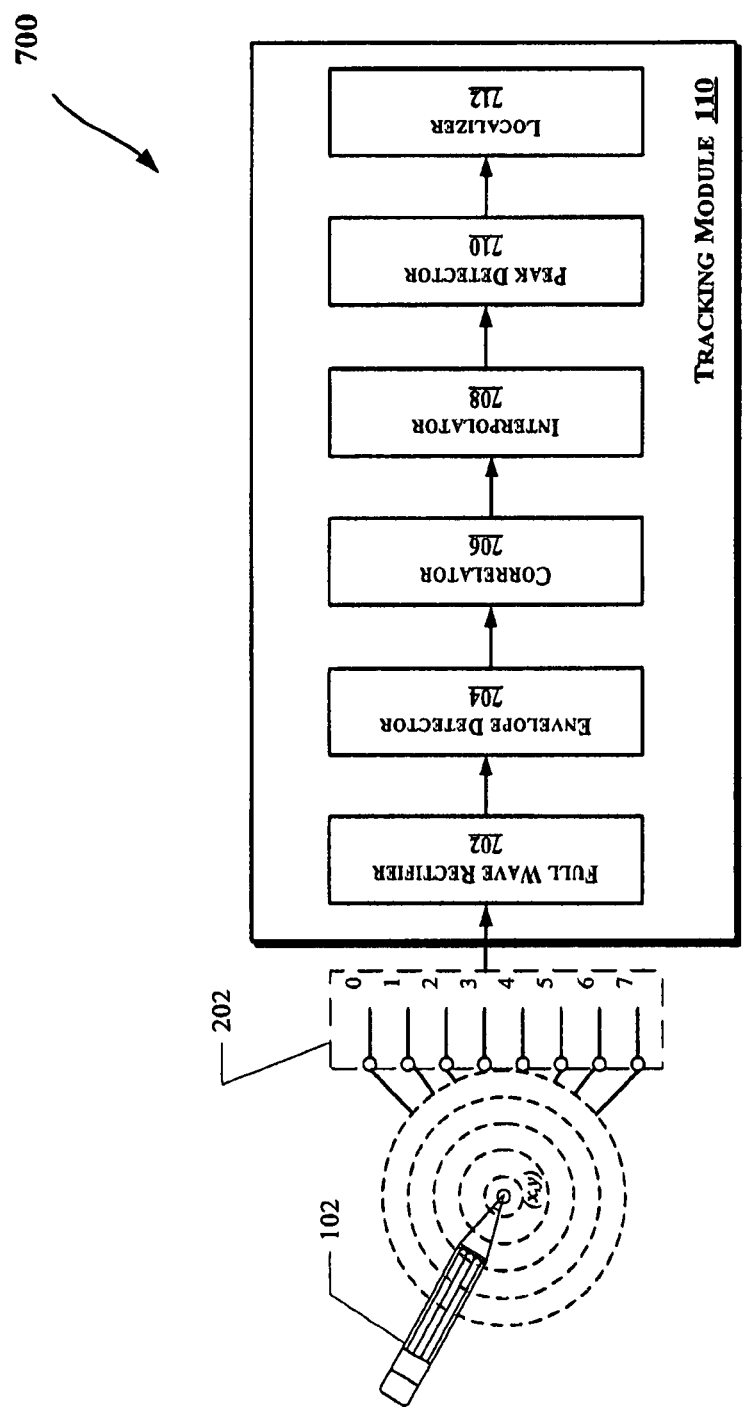

FIG. 7 illustrates a block diagram of an embodiment of an ultrasonic tracking system 700. The system 700 may include the ultrasonic signal generator 102 and the array of ultrasonic receivers 202 to receive the generated ultrasonic signals. As discussed with reference to FIG. 1, the ultrasonic signals from the ultrasonic signal generator 102 may be digitized (e.g., by the digitizer 108) prior to providing the signals to the tracking module 110. Furthermore, the array 202 may digitize the generated ultrasonic signals in an embodiment.

Figure 8:
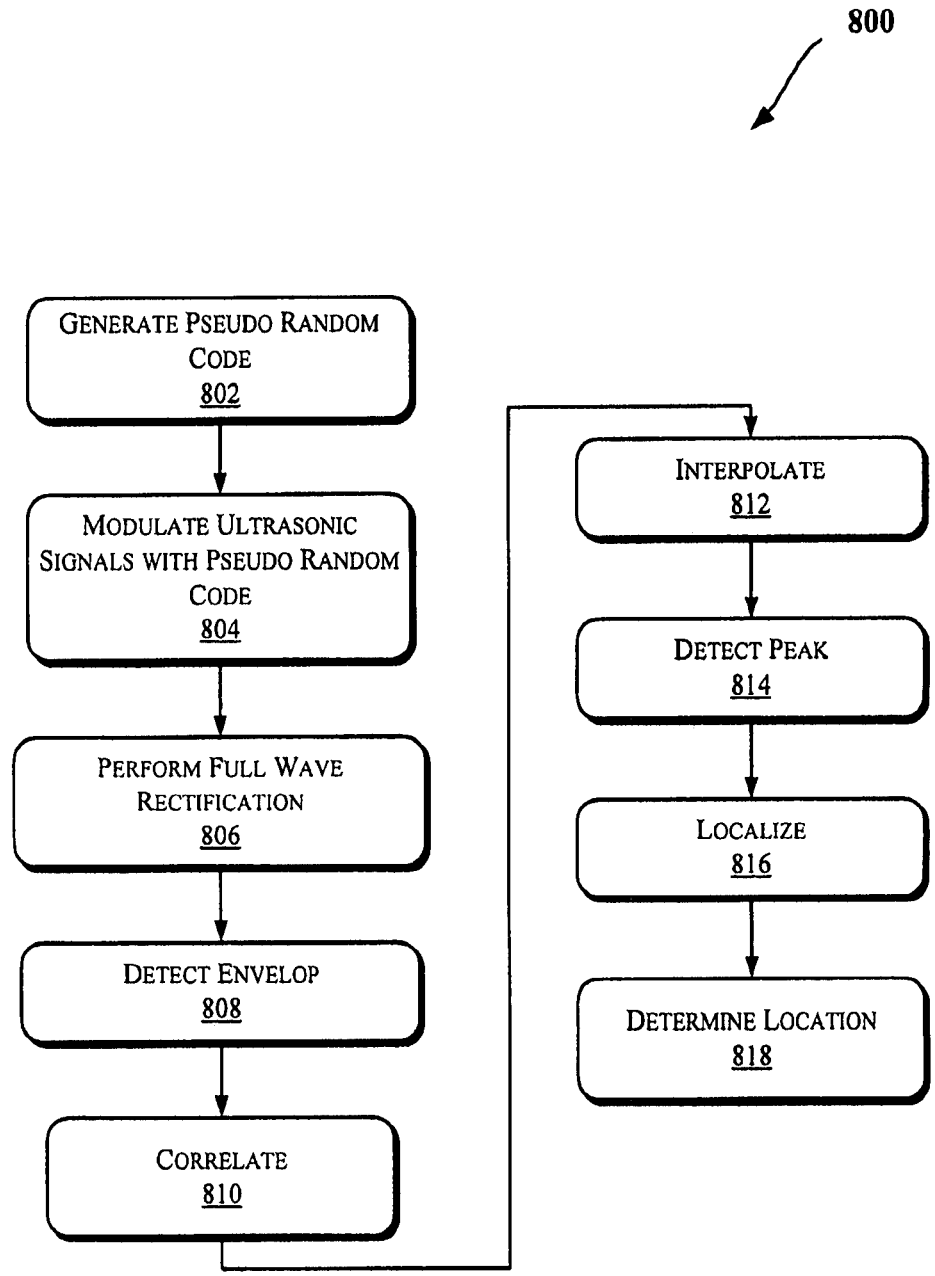

FIG. 8 illustrates a flow diagram of an embodiment of a method 800 to determine the location of an ultrasonic signal generator. In an embodiment, the systems 100 and 700 of FIGS. 1 and 7 may perform one or more stages discussed with reference to FIG. 8. Also, some stages of the method 800 (such as 806-818) may be performed by instructions stored on a computer readable medium and executed on one or more processors (such as processors 1402 of FIG. 14).

Referring to FIGS. 1, 7, and 8, the ultrasonic signal generator 102 may comprise logic that generates pseudo random code(s) (802), as will be further discussed with reference to FIGS. 10A-C. The ultrasonic signal generator 102 may further comprise logic that modulates (804) the generated ultrasonic signals with the pseudo random code(s) (802). As discussed with reference to FIG. 1, the signals from the ultrasonic signal generator 102 may be digitized (e.g., by the digitizer 108 and/or the array 202), e.g., to form digital ultrasonic signals. The digital ultrasonic signals may be provided to the tracking module 110 to determine the location (or coordinates) of the ultrasonic signal generator 102.

At a stage 806, the modulated signals are rectified (806) (e.g., by the full wave rectifier 702), as will be further discussed with reference to FIG. 12C. The full wave rectifier 702 may include two or more diodes in an embodiment to rectify the modulated signals. At a stage 808, an envelope is detected for each rectified signal (806), e.g., by the envelope detector 704. In one embodiment, the envelope detection (808) extracts the pseudo random codes from the ultrasonic signals, as will be further discussed with reference to FIG. 12D. Any suitable envelope detection technique may be utilized such as Hilbert Transformation. The detected envelope of the stage 808 may be provided to a correlator 706 to correlate (810) the ultrasonic signals. For example, the correlation techniques discussed with reference to the stage 508 of FIG. 5 may be utilized. At a stage 812, an interpolator 708 may interpolate the correlated data (810). The interpolation may be realized by N point FFT and k*N point inverse FFT (IFFT). (k−1) may represent the number of points interpolated between two adjacent sample points.

For an N-point time sequence x(n), n=0, 1, ..., N−1, its FFT may be:

$$X_N(k) = \sum_{n=0}^{N-1} x(n) e^{-j\frac{2\pi}{N}kn} = \sum_{n=0}^{N-1} x(n) W_N^{kn}$$

and $$W_N^{kn} = e^{-j\frac{2\pi}{N}kn}$$

where $$W_N^{kn} = e^{-j\frac{2\pi}{N}kn}$$

is the transformation element.

In an embodiment, to determine $X_{KN}(k)$ from $X_N(k)$ the following may be used:

$$X_{KN}(k) = \begin{cases} X_N(k) & k = 0, \ldots, N-1 \\ 0 & k = N, \ldots, KN-1 \end{cases}$$

For a K*N-point time sequence $X_{KN}(k)$, k=0, 1, ..., KN−1, the IFFT may be calculated as follows:

$$X_{KN}(n) = \frac{1}{KN} \sum_{k=0}^{KN-1} X_{KN}(k) e^{-j\frac{2\pi}{KN}nk} = \sum_{k=0}^{KN-1} X_{KN}(k) W_{KN}^{-kn},$$

n = 0, 1, ..., KN − 1 and $$W_{KN}^{kn} = e^{-j\frac{2\pi}{KN}}$$

The tracking system's (700) resolution pre may be calculated as follows:

$$pre = \frac{192 \text{ KHz} \times k}{340 \text{ m/s}} \times 25.4 \text{ mm/inch} = 14.3435 \ k(dpi)$$

where 192 kHz is the sample frequency and 340 m/s is the velocity of sound.

Hence, a resolution of more than about 1400 dpi may be achieved by 100 times interpolation.

At a stage 814, a peak detector 710 detects the peak of each interpolated signal (812). Any suitable peak detection technique may be utilized such as mass spectrometry. In an embodiment, the peak detector 710 provides the TDOA estimates. After the stage 814, the TDOA estimates may be provided to a localizer 712 to determine one or more intersections that may be utilized to determine the location (or coordinates) of the ultrasonic signal generator 102 such as discussed with reference to FIGS. 2, 4, and 6A-6C. For example, the localizer 712 may utilize hyperbolas to determine the one or more intersections. Clustering techniques (such as those discussed with reference to the stages 412-416 of FIG. 4) may also be utilized to narrow down the choices of intersections to determine the location of the ultrasonic signal generator 102.

Figure 9:
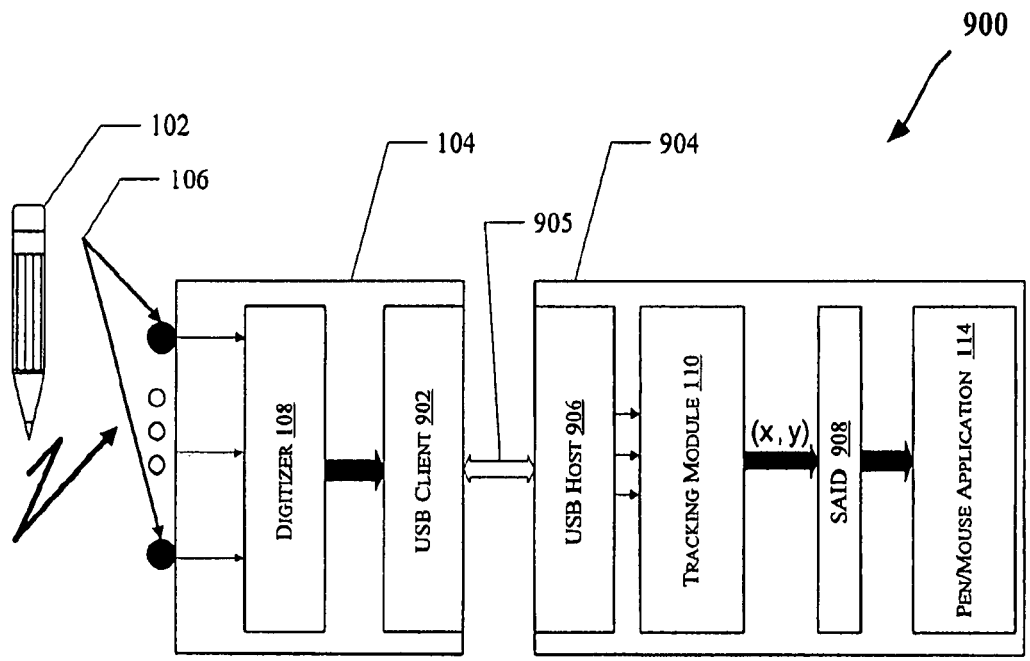

FIG. 9 illustrates an embodiment of an ultrasonic tracking system 900. The system 900 may track the location of the ultrasonic signal generator 102 relative to the panel 104. The ultrasonic sensors (or receivers) 106 receive the generated ultrasonic signals and provide them to the digitizer 108. As discussed with reference to FIG. 1, the digitizer 108 may include an A/D converter, a signal sampling logic, or the like. For example, in embodiments where the ultrasonic signals are modulated with pseudo random codes (such as the embodiments discussed with reference to FIGS. 7 and 8), the digitizer 108 may include a signal sampling logic (with a sample rate of about 192 kHz in one embodiment). Otherwise, an A/D converter of the digitizer 108 may be utilized to convert the analog ultrasonic signals to digital format. The digital ultrasonic signals may be provided to a universal serial bus (USB) client 902 to be communicated to a host-based driver 904 through a USB bus 905. Other bus topologies may also be utilized such as those discussed with reference to bus 1422 of FIG. 14.

The bus 905 may be coupled to a USB host 906 of the driver 904 to receive the digital ultrasonic signals and provide them to the tracking module 110. In an embodiment, the tracking module 110 may be those discussed with reference to FIGS. 2 and 7. The tracking module 110 determines the location (or coordinates) of the ultrasonic signal generator 102 and provides the location to a standard audio input device (SAID) 908. The SAID 908 may support some pen/mouse applications (114) without any change. For example, the location may be provided to a standard interface (SAID 908) and follow that interface for application (114) call-backs. As discussed with reference to FIG. 1, the coordinates of the ultrasonic signal generator 102 may be directly provided to the application 114.

FIG. 10A illustrates a block diagram of an embodiment of an m-sequence generator 1000. In an embodiment, the ultrasonic signal generator 102 discussed with reference to FIG. 7 may comprise the m-sequence generator 1000. Also, the m-sequence generator 1000 may perform the stage 802 of FIG. 8. As illustrated in FIG. 10A, the m-sequence generator 1000 may include a linear feedback shift register 1002 that is clocked by a clock 1004 and feeds the stored values through an adder 1005. The output sequences of n-stage register (1006) repeats after $2^n-1$ cycles, e.g., the m-sequences are $2^n-1$ bits. One property of an m-sequence is that the number of binary 0's is one bit less than 1's. Also, the number of m-sequences is limited; namely, n-stage registers may generate $$\frac{\Phi(2^n-1)}{n}$$

m-sequences (where $\Phi(x)$ is Euler's number). FIG. 10B illustrates an embodiment of a table 1030. The table 1030 shows the values shifted through the bits of the register 1002 of FIG. 10A. In an embodiment, the ultrasonic signal generator 102 discussed with reference to FIG. 7 may comprise an M-sequence generator (e.g., instead of or in addition to the m-sequence generator 1000). The M-sequence generator is an extension of m-sequence generator and adds a '0' to the m-sequence to make the number of binary 0's equal to 1's. Also, the M-sequence generator may perform the stage 802 of FIG. 8.

FIG. 10C illustrates a block diagram of an embodiment of a gold sequence generator 1060. In an embodiment, the ultrasonic signal generator 102 discussed with reference to FIG. 7 may comprise the gold sequence generator 1060. Also, the gold sequence generator 1060 may perform the stage 802 of FIG. 8. In an embodiment, the gold sequence generator 1060 provides more pseudo random codes than the m-sequence generator 1000 of FIG. 10A.

As illustrated in FIG. 10C, the gold sequence generator 1060 may generate gold sequence codes (1062) by sum modulo 2 (1064) of two different equal-period equal-generate-velocity m-sequences (1070 and 1072 clocked by a clock 1074) which have three-value correlation $\{-1,-R(\tau),R(\tau)-2\}$ where $R(\tau)$ is defined as follows:

$$R(\tau) = \begin{cases} 2^{\frac{n+1}{2}}+1 & n\text{: odd} \\ 2^{\frac{n}{2}+1}+1 & n\text{: even} \end{cases}$$

where n indicates that the two m-sequences are generated by an n-stage register.

The number of Gold codes may be $2^N+1$, where N is the m-sequence length, $N=2^n-1$. In an embodiment, the pseudo random code(s) generated by the generators 1000 and 1060 may have correlation properties that are utilized by the stage 810 of FIG. 8.

Furthermore, when compared to the m-sequences, gold codes may have the following features. First, when evaluating the ratio of the maximum cross-correlation coefficient and the autocorrelation coefficient, the ratio of gold codes is smaller than the ratio of the m-sequences when n>4, see, e.g., Table 1 below. Second, when n>4, gold codes' peak value of cross-correlation is smaller than m-sequences', see Table 1 below. Third, gold codes have a larger number of codes than m-sequences, because two three-value correlation m-sequences generated by n-stage registers may generate $2^n+1$ gold codes such as discussed with reference to FIG. 10C. Fourth, the gold code generator (1060) includes more complex logic than m-sequences generator (1000). Base on these features, when a few pseudo random codes are needed, m-sequences may be chosen; otherwise, gold codes may be chosen.

TABLE 1 m-sequence versus gold code

| n | $N = 2^n - 1$ | Number of m-sequence | $\phi_{max}$ | $\phi_{max}/\phi(0)$ | t(m) | t(m)/$\phi(0)$ |
|---|---|---|---|---|---|---|
| 3 | 7 | 2 | 5 | 0.71 | 5 | 0.71 |
| 4 | 16 | 2 | 9 | 0.60 | 9 | 0.60 |
| 5 | 31 | 6 | 11 | 0.35 | 9 | 0.29 |
| 6 | 63 | 6 | 23 | 0.36 | 17 | 0.27 |
| 7 | 127 | 18 | 41 | 0.32 | 17 | 0.13 |
| 8 | 255 | 16 | 95 | 0.37 | 33 | 0.13 |
| 9 | 511 | 46 | 113 | 0.22 | 33 | 0.06 |
| 10 | 1023 | 60 | 383 | 0.37 | 65 | 0.06 |
| 11 | 2047 | 176 | 287 | 0.14 | 65 | 0.03 |
| 12 | 4095 | 144 | 1407 | 0.34 | 129 | 0.03 |

$\phi_{max}$: Peak value of m-sequences' cross-correlation
$\phi(0)$: Peak value of m-sequences' and gold codes' autocorrelation, which equals to the code's length
t(m): Peak value of gold-codes' cross-correlation Moreover, in pseudo random code US pen systems (such as those discussed with reference to FIGS. 1, 4, 7, and 9), the pen's (102) refresh-frequency $f_{refresh}$ may be influenced by pseudo random code's length. For example, in each pseudo random code period, one pen position may be estimated. Thus, the longer the pseudo random code, the lower the pen's refresh-frequency:

$$f_{refresh} = \frac{f_{pulse}}{N}$$

where $f_{pulse}$ represents the frequency of the ultrasonic pulse discontinuously generated by the pen (102), N represents the pseudo random code's length.

Assuming that the time period from the beginning to the end of pulse may be about 20 times the ultrasonic signal's period, the following holds:

$$f_{pulse} = \frac{f_{US}}{20}$$

Moreover, a typical value of $f_{US}$ may be about 80 (kHz) when $f_{US}$=80 kHz, $f_{refresh}$≈571.4 Hz. As a result, the pen (102) may refresh at most 571 times per second when N=7. Accordingly, seven, the minimum length of m-sequence, may be a candidate for a pseudo random code's length in an embodiment. In one embodiment, to conserve power, one or more of the transmitters on the ultrasonic signal generator (102) may not send any signals when a '1' is to be transmitted; and send one pulse when a '0' is to be transmitted. Hence, since there are 4 1's in the 7-bit m-sequence while only 3 0's, In an embodiment, the 7-bit sequence 0100111 may be utilized.

In an embodiment, pseudo random codes, such as those discussed with reference to FIGS. 7 and 8, may provide one or more of the following features. First, higher bit rate may be achieved than the data bit rate. Thus, pseudo random codes may spread the signal's spectrum. Narrow band noise (e.g., interference) may be reduced by omitting spectrum information in that region. Also, due to the spectrum spread, unauthorized signal interception may also be reduced. Second, pseudo random codes may provide good autocorrelation and low cross-correlation. As a result, signals may share the same frequency domain by using different pseudo random codes and a receiver may distinguish the signals by using the correlation.

Figure 11:
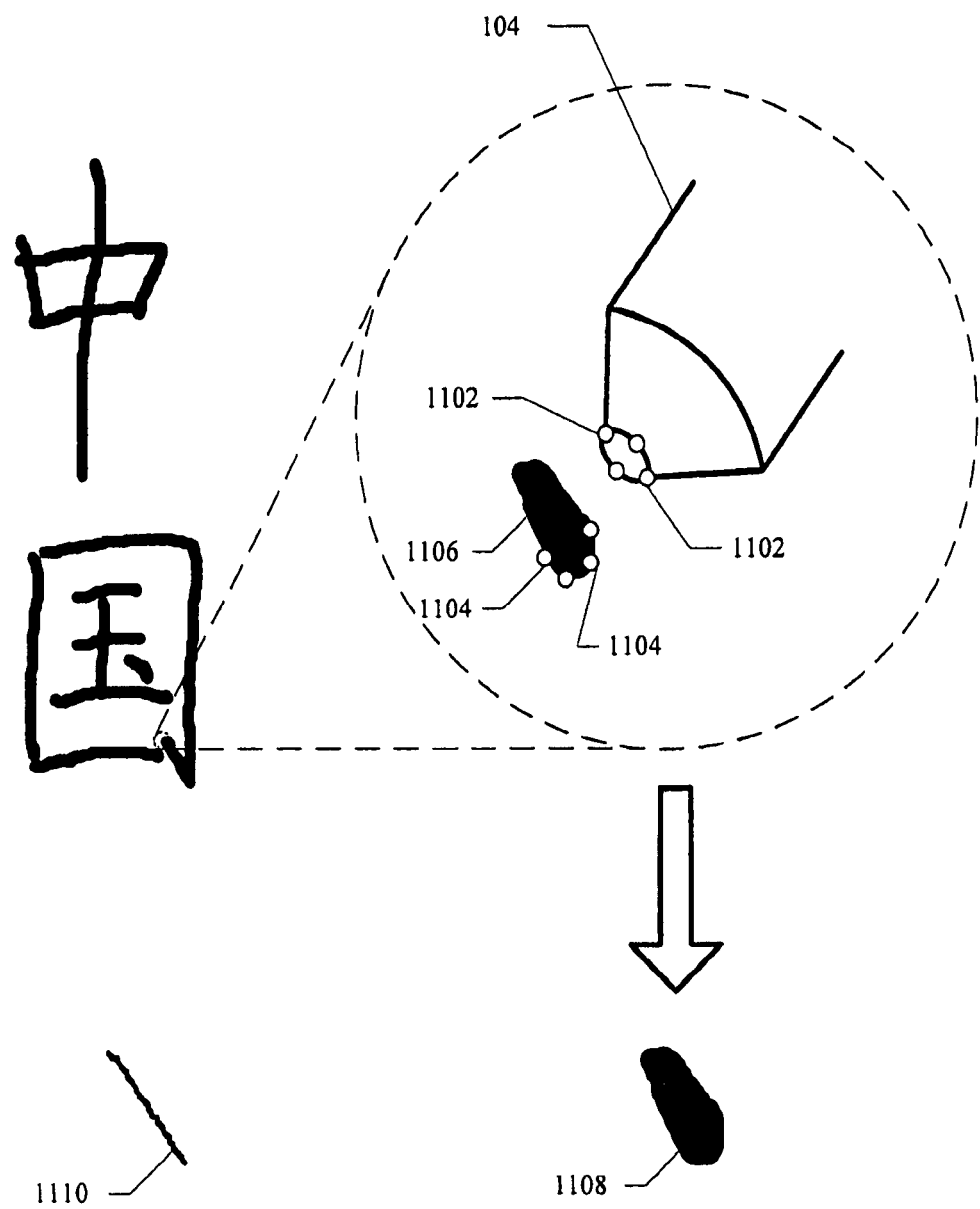
FIG. 11 illustrates an embodiment of an ultrasonic signal generator with multiple ultrasonic transmitters.

FIG. 11 illustrates an embodiment of an ultrasonic signal generator with multiple ultrasonic transmitters. As FIG. 11 shows, the pseudo random code pen (102) may have multiple ultrasonic transmitters (or transducers) 1102 on the tip of the pen. Each of the transmitters 1102 may generate ultrasonic signals that are modulated by different pseudo random codes (such as discussed with reference to the stage 804 of FIG. 8). A receiver (such as the receiver 106 of FIG. 1) may distinguish signals from different transmitters by correlation (e.g., as discussed with reference to the stage 810 of FIG. 8). In this way, the edges (1104) of the handwriting (1106) may be recognized. For example, a pen (102) with multiple transmitters (1104) may allow the recognition of the same writing at a much higher resolution (e.g., 1108 versus 1110, respectively). Thus, the fidelity of an ultrasonic pen system with a pen that employs multiple transmitters may be enhanced.

Figure 12A:
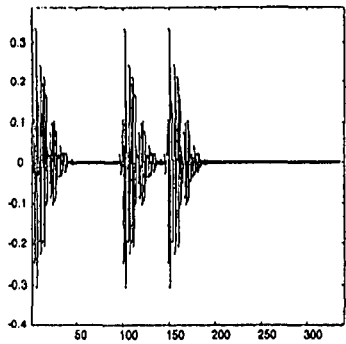
Figure 12B:
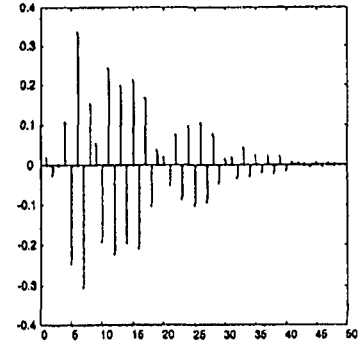
Figure 12C:
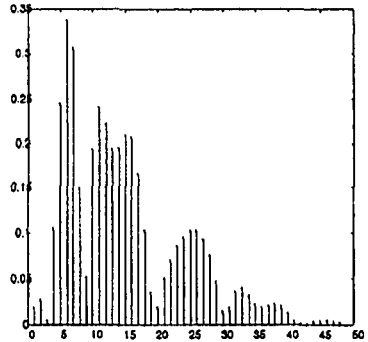
Figure 12D:
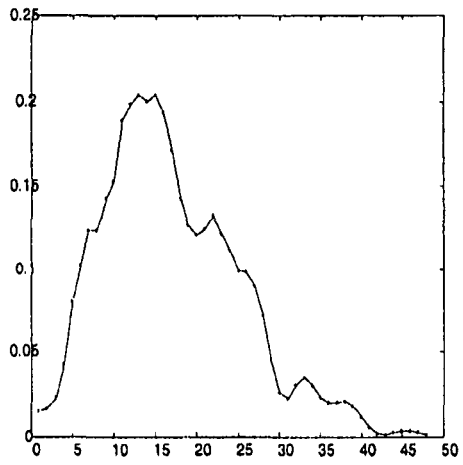
Figure 12E:
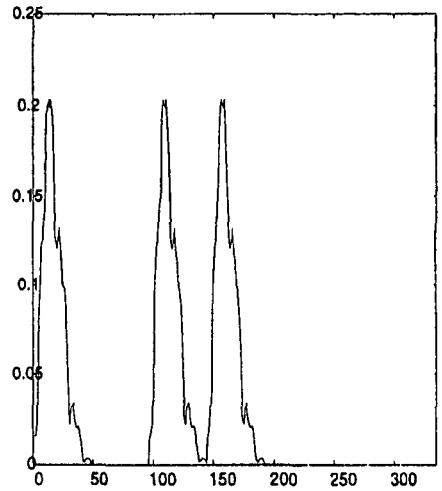

FIG. 12A illustrates a sample waveform (of amplitude versus time) corresponding to the digital ultrasonic signals received by the tracking module 110 of FIG. 7, according to an embodiment. FIGS. 12B-H illustrate sample waveforms (of amplitude versus time) that may be provided after application of the stages 806-812 of FIG. 8, according to various embodiments. For example, the waveform of FIG. 12A may be a sampled signal that is modulated with pseudo random code (0100111). FIG. 12B illustrates a single pulse of the waveform of FIG. 12A. FIG. 12C illustrates the resulting waveform after performing a full wave rectification (806). FIG. 12D illustrates the resulting waveform after envelope detection (808). FIG. 12E illustrates the received pseudo random sequence (0100111) which has been determined by performing the stage 808 of FIG. 8. FIG. 12F illustrates the resulting waveform after performing correlation (810). FIG. 12G illustrates the waveform where the sample amplitude is greater than 0.6. FIG. 12H illustrates the resulting waveform after performing interpolation (812). As may be seen by comparing FIGS. 12G and 12H, the accuracy of TDOA estimation may be three times better (without TDOA estimation), in part because of three times interpolation (such as discussed with reference to the stage 812 of FIG. 8).

FIGS. 13A and 13B illustrate sample waveforms for a single pulse autocorrelation and a pseudo random code autocorrelation, respectively, according to various embodiments. The pseudo random code for the wave form of FIG. 13B may be 0100111. As discussed with reference to FIGS. 7 and 8, the TDOA may be estimated at the time the peak value of correlation is determined (e.g., by the peak detector 710 of FIG. 7 at the stage 814 of FIG. 8). As illustrated, the waveform of FIG. 13A may include relatively more local extrema near the absolute extremum, e.g., peak value, and their values surpass 50% of the peak value. Thus, estimation error may occur when local extrema are mistakenly chosen as the peak value (e.g., due to interference). However, in FIG. 13B, the local extrema are about 10% of the peak value. Hence, in an embodiment, a search for peaks above a selected threshold value (e.g., 0.6) may be performed to limit (or avoid) estimation error. Also, the pseudo random codes' triangle-feature autocorrelation of FIG. 13B indicates that the estimation accuracy may be enhanced by interpolation in an embodiment, such as discussed with reference to FIG. 8.

Figure 14:
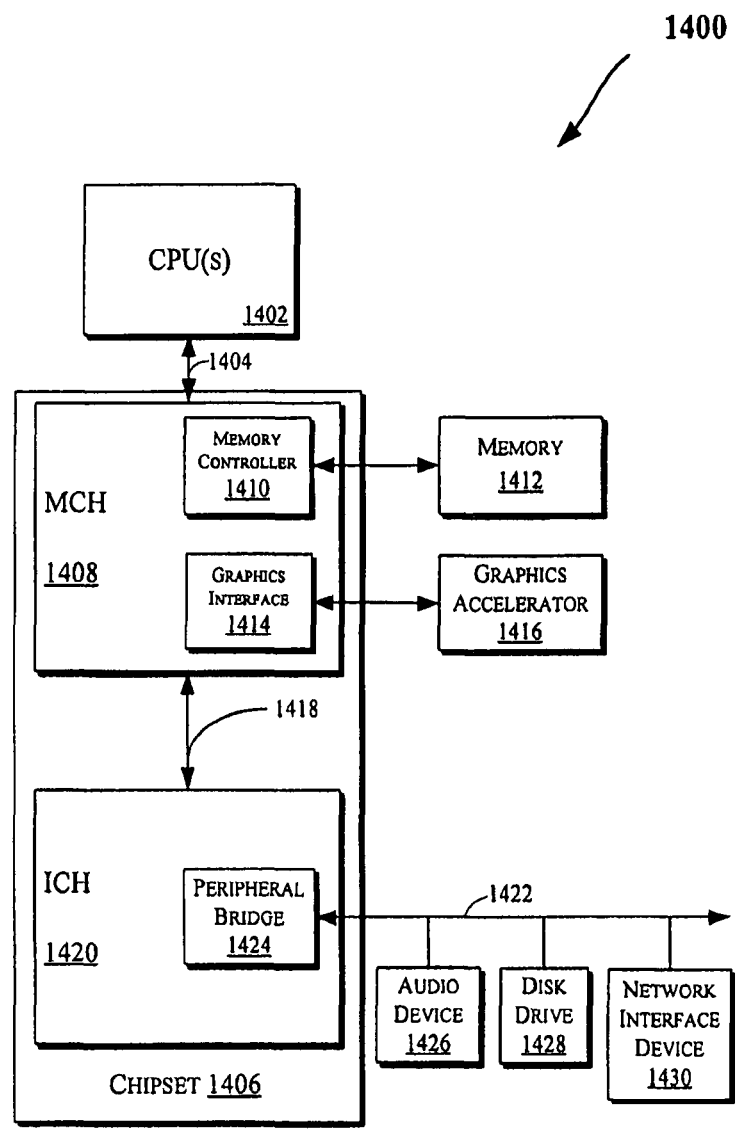
FIG. 14 illustrates a block diagram of a computing system in accordance with an embodiment.

FIG. 14 illustrates a block diagram of a computing system 1400 in accordance with an embodiment of the invention. The computing system 1400 may include one or more central processing unit(s) (CPUs) 1402 or processors coupled to an interconnection network (or bus) 1404. The processors (1402) may be any suitable processor such as a general purpose processor, a network processor, or the like (including a reduced instruction set computer (RISC) processor or a complex instruction set computer (CISC)). Moreover, the processors (1402) may have a single or multiple core design. The processors (1402) with a multiple core design may integrate different types of processor cores on the same integrated circuit (IC) die. Also, the processors (1402) with a multiple core design may be implemented as symmetrical or asymmetrical multiprocessors.

A chipset 1406 may also be coupled to the interconnection network 1404. The chipset 1406 may include a memory control hub (MCH) 1408. The MCH 1408 may include a memory controller 1410 that is coupled to a memory 1412. The memory 1412 may store data and sequences of instructions that are executed by the CPU 1402, or any other device included in the computing system 1400. In one embodiment of the invention, the memory 1412 may include one or more volatile storage (or memory) devices such as random access memory (RAM), dynamic RAM (DRAM), synchronous DRAM (SDRAM), static RAM (SRAM), or the like. Nonvolatile memory may also be utilized such as a hard disk. Additional devices may be coupled to the interconnection network 1404, such as multiple CPUs and/or multiple system memories.

The MCH 1408 may also include a graphics interface 1414 coupled to a graphics accelerator 1416. In one embodiment of the invention, the graphics interface 1414 may be coupled to the graphics accelerator 1416 via an accelerated graphics port (AGP). In an embodiment of the invention, a display (such as a flat panel display) may be coupled to the graphics interface 1414 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 1418 may couple the MCH 1408 to an input/output control hub (ICH) 1420. The ICH 1420 may provide an interface to input/output (I/O) devices coupled to the computing system 1400. The ICH 1420 may be coupled to a bus 1422 through a peripheral bridge (or controller) 1424, such as a peripheral component interconnect (PCI) bridge, a universal serial bus (USB) controller, or the like. The bridge 1424 may provide a data path between the CPU 1402 and peripheral devices. Other types of topologies may be utilized. Also, multiple buses may be coupled to the ICH 1420, e.g., through multiple bridges or controllers. Moreover, other peripherals coupled to the ICH 1420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or the like.

The bus 1422 may be coupled to an audio device 1426, one or more disk drive(s) 1428, and a network interface device 1430. Other devices may be coupled to the bus 1422. Also, various components (such as the network interface device 1430) may be coupled to the MCH 1408 in some embodiments of the invention. In addition, the CPU 1402 and the MCH 1408 may be combined to form a single chip. Furthermore, the graphics accelerator 1416 may be included within the MCH 1408 in other embodiments of the invention.

Additionally, the computing system 1400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 1428), a floppy disk, a compact disk ROM (CD-ROM), a digital versatile disk (DVD), flash memory, a magneto-optical disk, or other types of nonvolatile machine-readable media suitable for storing electronic instructions and/or data.

In various embodiments, one or more of the operations discussed herein, e.g., with reference to FIGS. 1-14, may be implemented as hardware (e.g., logic circuitry), software, firmware, or combinations thereof, which may be provided as a computer program product, e.g., including a machine-readable or computer-readable medium having stored thereon instructions used to program a computer to perform a process discussed herein. The machine-readable medium may include any suitable storage device such as those discussed with reference to FIGS. 1 and 14.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with that embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method comprising:
selecting a plurality of pairs of digital ultrasonic signals to form two or more pairs of digital ultrasonic signals;
estimating time difference of arrival(TDOA) for each of the two or more pairs of digital ultrasonic signals;
determining an intersection of each pair of the TDOA estimated digital ultrasonic signals to form one or more intersections;
determining a location of an ultrasonic signal generator corresponding to at least one of the one or more intersections at least in part based on a crosspower-spectrum of the two or more pairs of digital ultrasonic signals; and
generating first and second pseudo random codes at a first generator and a second generator, respectively, and combining the first and second pseudo random codes based on a clock signal to generate pseudo random output codes, wherein the pseudo random output codes are to have correlation properties that are used in modulating the pseudo random output codes with ultrasonic signals generated by the ultrasonic signal generator.

2. The method of claim 1, further comprising receiving ultrasonic signals generated by the ultrasonic signal generator.

3. The method of claim 1, further comprising digitizing ultrasonic signals generated by the ultrasonic signal generator to form the digital ultrasonic signals.

4. The method of claim 1, further comprising forming a cluster with a plurality of the intersections.

5. The method of claim 4, wherein determining the location of the ultrasonic generator comprises selecting one of the intersections in the cluster.

6. The method of claim 4, wherein determining the location of the ultrasonic generator comprises excluding one or more of the intersections that are more than a threshold distance from other members of the cluster.

7. The method of claim 1, wherein determining the location of the ultrasonic generator comprises weighting a plurality of the intersections.

8. The method of claim 1, further comprising:
performing a full wave rectification of the modulated ultrasonic signals;
detecting an envelope of the rectified signals;
correlating the enveloped signals;
interpolating the correlated signals; and
detecting a peak of the interpolated signals.

9. The method of claim 1, wherein determining the location of the ultrasonic signal generator corresponding to at least one of the one or more intersections is to be performed at least in part based on a generalized cross-correlation(GCC) of the crosspower-spectrum of the two or more pairs of digital ultrasonic signals.

10. The method of claim 1, wherein the cross-power spectrum is to be determined based on a weighting function and the weighting function is a phase transform weighting function.

11. The method of claim 1, wherein the cross-power spectrum is to be determined based on a weighting function and the weighting function is a modified phase transform weighting function.

12. The method of claim 11, wherein the modified phase transform weighting function is less sensitive to reverberation or non-transitory noise than a maximum likelihood weighting function.

13. The method of claim 1, wherein the cross-power spectrum is to be determined based on a weighting function and the weighting function is a maximum likelihood weighting function.

14. An apparatus comprising:
a tracking module to:
select a plurality of pairs of digital ultrasonic signals to form two or more pairs of digital ultrasonic signals;
estimate time difference of arrival(TDOA) for each of the two or more pairs of digital ultrasonic signals;
determine an intersection of each pair of the TDOA estimated digital ultrasonic signals to form one or more intersections;
determine a location of an ultrasonic signal generator corresponding to at least one of the one or more intersections at least in part based on a crosspower-spectrum of the two or more pairs of digital ultrasonic signals; and
generate first and second pseudo random codes at a first generator and a second generator, respectively, and combining the first and second pseudo random codes based on a clock signal to generate pseudo random output codes, wherein the pseudo random output codes are to have correlation properties that are used in modulating the pseudo random output codes with ultrasonic signals generated by the ultrasonic signal generator.

15. The apparatus of claim 14, further comprising at least three ultrasonic sensors(106) to receive ultrasonic signals generated by the ultrasonic signal generator.

16. The apparatus of claim 14, further comprising a digitizer(108) to digitize ultrasonic signals generated by the ultrasonic signal generator.

17. The apparatus of claim 14, further comprising a memory to store one or more applications that receive the location of the ultrasonic signal generator.

18. The apparatus of claim 14, wherein the ultrasonic signal generator comprises one or more of an m-sequence generator, a gold sequence generator, or an M-sequence generator.

19. The apparatus of claim 14, wherein the tracking module comprises two or more TDOA modules, at least one intersection locator, or at least one clustering module.

20. The apparatus of claim 14, wherein the tracking module comprises one or more of a full wave rectifier, an envelope detector, a correlator, an interpolator, a peak detector, or a localizer.

21. The apparatus of claim 14, wherein the ultrasonic signal generator comprises a plurality of ultrasonic transmitters.

22. A system comprising:
a volatile memory to store one or more applications; and
a tracking module to:
select a plurality of pairs of digital ultrasonic signals to form two or more pairs of digital ultrasonic signals;
estimate time difference of arrival(TDOA) for each of the two or more pairs of digital ultrasonic signals;
determine an intersection of each pair of the TDOA estimated digital ultrasonic signals to form one or more intersections;
determine a location of an ultrasonic signal generator corresponding to at least one of the one or more intersections at least in part based on a crosspower-spectrum of the two or more pairs of digital ultrasonic signals; and
generate first and second pseudo random codes at a first generator and a second generator, respectively, and combining the first and second pseudo random codes based on a clock signal to generate pseudo random output codes, wherein the pseudo random output codes are to have correlation properties that are used in modulating the pseudo random output codes with ultrasonic signals generated by the ultrasonic signal generator.

23. The system of claim 22, further comprising at least three ultrasonic sensors(106) to receive ultrasonic signals generated by the ultrasonic signal generator.

24. The system of claim 22, wherein the volatile memory is one of RAM, DRAM, SDRAM, or SRAM.

25. A non-transitory computer-readable medium comprising:
stored instructions to select a plurality of pairs of digital ultrasonic signals to form two or more pairs of digital ultrasonic signals;
stored instructions to estimate time difference of arrival (TDOA) for each of the two or more pairs of digital ultrasonic signals;
stored instructions to determine an intersection of each pair of the TDOA estimated digital ultrasonic signals to form one or more intersections;
stored instructions to determine a location of an ultrasonic signal generator corresponding to at least one of the one or more intersections at least in part based on a crosspower-spectrum of the two or more pairs of digital ultrasonic signals; and
stored instructions to generate first and second pseudo random codes at a first generator and a second generator, respectively, and combining the first and second pseudo random codes based on a clock signal to generate pseudo random output codes, wherein the pseudo random output codes are to have correlation properties that are used in modulating the pseudo random output codes with ultrasonic signals generated by the ultrasonic signal generator.

26. The computer-readable medium of claim 25, further comprising stored instructions to form a cluster with a plurality of the intersections.

27. The computer-readable medium of claim 25, further comprising stored instructions to:
perform a full wave rectification of the modulated ultrasonic signals;
detect an envelope of the rectified signals;
correlate the enveloped signals;
interpolate the correlated signals; and
detect a peak of the interpolated signals.

* * * * *